United States Patent
Tsuda et al.

(10) Patent No.: US 10,145,297 B2
(45) Date of Patent: Dec. 4, 2018

(54) CONTROL DEVICE FOR ENGINE EQUIPPED WITH TURBO-SUPERCHARGER

(71) Applicant: MAZDA MOTOR CORPORATION, Hiroshima (JP)

(72) Inventors: Amane Tsuda, Hatsukaichi (JP); Hiroaki Deguchi, Hiroshima (JP); Kenjiro Konomi, Hiroshima (JP); Nobuo Yunoki, Hiroshima (JP); Yasushi Niwa, Higashihiroshima (JP); Kazuya Niida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 115 days.

(21) Appl. No.: 15/122,755

(22) PCT Filed: Jan. 19, 2015

(86) PCT No.: PCT/JP2015/000202
§ 371 (c)(1),
(2) Date: Aug. 31, 2016

(87) PCT Pub. No.: WO2015/145924
PCT Pub. Date: Oct. 1, 2015

(65) Prior Publication Data
US 2017/0067394 A1    Mar. 9, 2017

(30) Foreign Application Priority Data
Mar. 28, 2014   (JP) .................................. 2014-069616

(51) Int. Cl.
*F02B 37/12*    (2006.01)
*F02B 39/16*    (2006.01)
(Continued)

(52) U.S. Cl.
CPC .............. *F02B 37/12* (2013.01); *F02B 33/40* (2013.01); *F02B 37/24* (2013.01); *F02B 39/16* (2013.01);
(Continued)

(58) Field of Classification Search
CPC .......... F02B 37/12; F02B 33/40; F02B 37/24; F02B 39/16; F02D 41/0047;
(Continued)

(56) References Cited

U.S. PATENT DOCUMENTS 5,386,698 A * 2/1995 Kamel .................... F02B 37/18
                                                          60/603
7,908,858 B2 * 3/2011 Gehrke .................... F02B 37/12
                                                         123/435
(Continued)

FOREIGN PATENT DOCUMENTS

DE   102006011188   *  9/2007  .......... F02B 29/0412
DE   102013001662   *  7/2014  .............. F02B 37/04
(Continued)

OTHER PUBLICATIONS

International Search Report issued in PCT/JP2015/000202; dated Apr. 21, 2015.
(Continued)

*Primary Examiner* — Jason Newton
(74) *Attorney, Agent, or Firm* — Studebaker & Brackett PC

(57) ABSTRACT

Disclosed is a controller for a turbocharged engine. The engine includes a supercharger configured to supercharge intake air using an exhaust gas from the engine, and including movable flaps arranged so that a boost pressure generated in an intake passage is adjustable. If a rotational speed of a turbine and compressor that constitute the supercharger has reached a first threshold lower than an endurance limit, (Continued)

an amount of fuel injected to the engine is reduced to a predetermined amount. If the rotational speed has reached a second threshold lower than the first threshold, the amount of fuel injected is reduced in accordance with an excess of the rotational speed over the second threshold.

8 Claims, 6 Drawing Sheets

(51) Int. Cl.
    *F02M 26/05*     (2016.01)
    *F02M 26/06*     (2016.01)
    *F02B 37/24*     (2006.01)
    *F02D 23/00*     (2006.01)
    *F02M 26/04*     (2016.01)
    *F02B 33/40*     (2006.01)
    *F02D 41/30*     (2006.01)
    *F02D 41/00*     (2006.01)
    *F02M 26/35*     (2016.01)
(52) U.S. Cl.
    CPC ......... *F02D 23/00* (2013.01); *F02D 41/0007* (2013.01); *F02D 41/0047* (2013.01); *F02D 41/3005* (2013.01); *F02M 26/04* (2016.02); *F02M 26/05* (2016.02); *F02M 26/06* (2016.02); *F02B 2037/122* (2013.01); *F02B 2037/125* (2013.01); *F02M 26/35* (2016.02); *Y02T 10/144* (2013.01); *Y02T 10/47* (2013.01)
(58) Field of Classification Search
    CPC .. F02D 41/0007; F02D 41/3005; F02D 23/00; F02M 26/04; F02M 26/05; F02M 26/06; F02M 26/35
    USPC .......................................................... 60/602
    See application file for complete search history.

(56) References Cited

U.S. PATENT DOCUMENTS

| | | | | |
|---|---|---|---|---|
| 9,845,753 | B2* | 12/2017 | Tateishi | ............. F02D 41/042 |
| 2006/0011180 | A1* | 1/2006 | Sasaki | ................. F01N 3/0814 |
| | | | | 123/698 |
| 2009/0031723 | A1 | 2/2009 | Gehrke et al. | |
| 2009/0107455 | A1* | 4/2009 | Pallett | ................. F02D 41/0007 |
| | | | | 123/299 |
| 2010/0030453 | A1* | 2/2010 | Takahashi | ........... F02D 19/0684 |
| | | | | 701/104 |
| 2011/0023828 | A1 | 2/2011 | Kawabe et al. | |
| 2011/0131975 | A1* | 6/2011 | Styles | ....................... F02D 9/16 |
| | | | | 60/602 |
| 2011/0132322 | A1* | 6/2011 | Boyer | ..................... F02B 47/08 |
| | | | | 123/337 |
| 2011/0180039 | A1* | 7/2011 | Nada | ....................... F02D 35/02 |
| | | | | 123/445 |
| 2012/0014838 | A1* | 1/2012 | Yasui | .................. F02D 41/0062 |
| | | | | 422/105 |
| 2012/0179356 | A1* | 7/2012 | Ide | ...................... F02D 41/0007 |
| | | | | 701/104 |
| 2015/0253221 | A1* | 9/2015 | Nakano | ................... F02B 37/18 |
| | | | | 73/112.01 |
| 2015/0354443 | A1* | 12/2015 | Shin | ...................... F02D 41/107 |
| | | | | 60/273 |
| 2016/0265468 | A1* | 9/2016 | Takayanagi | ........... F02B 37/013 |
| 2017/0067394 | A1* | 3/2017 | Tsuda | ..................... F02M 26/05 |
| 2017/0218834 | A1* | 8/2017 | Kemmerling | ....... F02B 29/0412 |

FOREIGN PATENT DOCUMENTS

| | | | | |
|---|---|---|---|---|
| EP | 1640596 A1 * | 3/2006 | ............ | F02B 37/013 |
| JP | 55109728 A * | 8/1980 | ............ | F02B 37/007 |
| JP | 61-265331 A | 11/1986 | | |
| JP | 2001-132466 A | 5/2001 | | |
| JP | 2005-299618 A | 10/2005 | | |
| JP | 2009-221881 A | 10/2009 | | |
| JP | 2010-535311 A | 11/2010 | | |
| JP | 2011-185263 A | 9/2011 | | |
| JP | 2011185263 A * | 9/2011 | ............ | F02D 41/007 |

OTHER PUBLICATIONS

Written Opinion issued in PCT/JP2015/000202; dated Apr. 21, 2015.
International Preliminary Report on Patentability issued in PCT/JP2015/000202; dated May 10, 2016.

\* cited by examiner

EXHAUST GAS STREAM

REQUIRED INJECTION AMOUNT - CURRENT INJECTION AMOUNT

SECOND THRESHOLD - CURRENT TURBOCHARGER ROTATIONAL SPEED

CURRENT TURBOCHARGER ROTATIONAL SPEED − SECOND THRESHOLD

TRANSITION TIME FOR $N_{t2}$ TO REACH $N_{t1}$

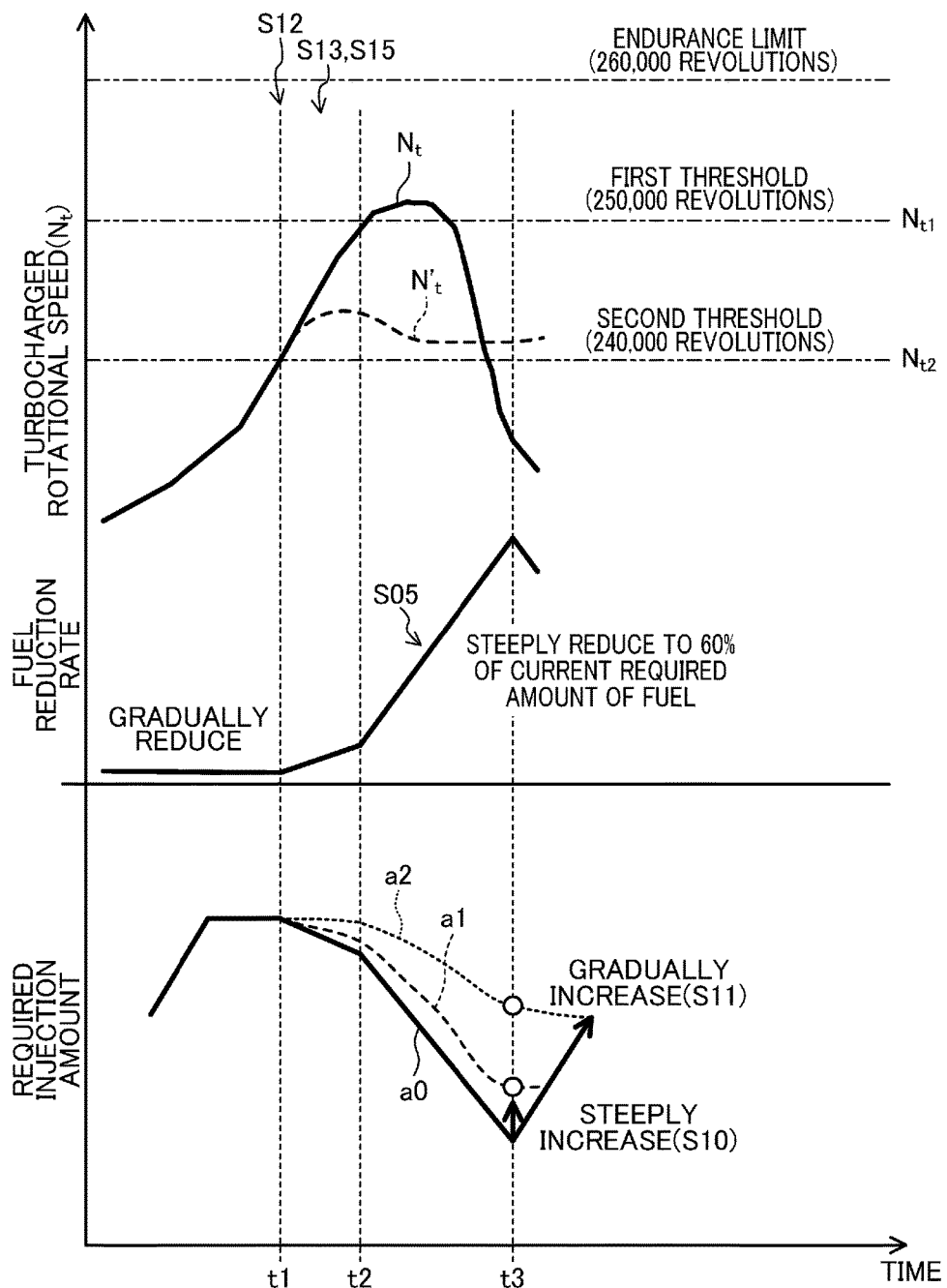

CONTROL DEVICE FOR ENGINE EQUIPPED WITH TURBO-SUPERCHARGER

TECHNICAL FIELD

The present invention relates to a controller for a turbocharged engine.

BACKGROUND ART

In recent years, variable geometry turbochargers (VGT) have been used in which turbines and compressors are downsized to allow an engine to be efficiently supercharged even at low engine speeds at which exhaust energy from the engine is low, and which include a turbine around which a plurality of movable flaps (referred to also as "movable vanes" or "nozzle vanes") are arranged.

A variable geometry turbocharger is not usually provided with a wastegate through which exhaust gas is released upstream of the turbocharger. Thus, if the rotational speed of its turbine exceeds a predetermined threshold, the supply of fuel is controlled to reduce an increase in the rotational speed of the turbine.

Patent Document 1 teaches estimating the rotational speed of a turbine based on the amount of intake air and the boost pressure, and reducing the amount of fuel supplied if the overspeed of the turbine is anticipated.

CITATION LIST

Patent Document

PATENT DOCUMENT 1: Japanese Unexamined Patent Publication No. 2011-185263

SUMMARY OF THE INVENTION

Technical Problem

Unfortunately, if the rotation of the turbocharger is controlled by fuel control, a time lag is generally caused. In addition, if the rotational speed threshold of the turbine is set to be low, the supercharging performance deteriorates. However, if the rotational speed threshold of the turbine is set to be high to the contrary, then the turbine overspeeds.

Furthermore, a downsized turbocharger rotates in a high rotational speed range near an endurance limit at high output. Thus, it is important to manage and control the turbocharger to prevent the rotational speed of the turbocharger from exceeding the endurance limit.

In view of the foregoing background, it is therefore an object of the present invention to provide a technique for managing and controlling a variable geometry turbocharger reliably such that its rotational speed does not exceed an endurance limit.

Solution to the Problem

To solve the problem, the present invention is characterized by setting a first threshold to be a rotational speed lower than a rotational speed associated with an endurance limit of a turbine and compressor of a variable geometry turbocharger, setting a second threshold to be a rotational speed lower than the first threshold, and controlling the amount of fuel injected differently depending on whether the current rotational speed is between the endurance limit and the first threshold or between the first and second thresholds.

The present invention is particularly directed to a controller for a turbocharged engine, and provides the following solutions.

Specifically, a first aspect of the invention provides a controller for a turbocharged engine. The engine includes a supercharger configured to supercharge intake air using an exhaust gas from the engine, and including movable flaps arranged so that a boost pressure generated in an intake passage is adjustable. If a rotational speed of a turbine and compressor that constitute the supercharger has reached a first threshold lower than an endurance limit, an amount of fuel injected to the engine is reduced to a predetermined amount, and if the rotational speed has reached a second threshold lower than the first threshold, the amount of fuel injected is reduced in accordance with an excess of the rotational speed over the second threshold.

According to the first aspect, the modes of control may be switched into a mode in which prevention of the rotational speed from increasing excessively is prioritized at a point in time when the rotational speed of the turbine and compressor (hereinafter referred to as the "turbocharger rotational speed") reaches the first threshold. When the turbocharger rotational speed is between the first and second thresholds, on the other hand, the control may be performed in a mode in which provision of supercharging performance is prioritized with an increase in the rotational speed reduced.

A second aspect of the invention is an embodiment of the controller of the first aspect. In the second aspect, if the rotational speed of the turbine and compressor stops increasing at a point in time before reaching the first threshold, the amount of fuel injected at that point in time may be maintained.

According to the second aspect, while the turbocharger rotational speed is reduced to a rotational speed lower than the first threshold, supercharging performance may be maintained.

A third aspect of the invention is an embodiment of the controller of the first or second aspect. In the third aspect, if the rotational speed has exceeded the first threshold, the amount of fuel injected may be reduced to a value obtained by decreasing a required injection amount of the fuel at a predetermined rate irrespective of the rotational speed.

According to the third aspect, if the turbocharger rotational speed has exceeded the first threshold, the amount of fuel injected is reduced at a predetermined rate from the required injection amount of the fuel, thereby reliably reducing the turbocharger rotational speed regardless of the amount of the fuel injected.

A fourth aspect of the invention is an embodiment of the controller of the first or second aspect. In the fourth aspect, if the rotational speed has exceeded the first threshold, the shorter the amount of time it takes for the rotational speed to reach the first threshold from the second threshold, the higher a rate of decrease from the required injection amount of the fuel is set to be.

According to the fourth aspect, if the turbocharger rotational speed has exceeded the first threshold, the shorter the amount of time it takes for the rotational speed to reach the first threshold from the second threshold, the higher a rate of decrease from the required injection amount of the fuel is set to be. As a result, the turbocharger rotational speed may be promptly and reliably reduced.

A fifth aspect of the invention is an embodiment of the controller of the third or fourth aspect. In the fifth aspect, in a situation where the rotational speed of the turbine and compressor is in a range of rotational speeds lower than or equal to the second threshold after the amount of fuel injected has been reduced, if a difference between the required injection amount of the fuel and a current amount of fuel injected is less than a predetermined value, the amount of the fuel injected may be steeply increased to the required injection amount, and if the difference is greater than the predetermined value, the amount of the fuel injected may be gradually increased to the required injection amount.

According to the fifth aspect, if the amount of the fuel injected needs to recover the required injection amount of the fuel, such a recovery may be controlled without running the risk of allowing overspeed. In addition, the fuel control may be prevented from causing a driver to feel something strange about the behavior of a vehicle.

A sixth aspect of the invention is an embodiment of the controller of the fifth aspect. In the sixth aspect, if the difference between the required injection amount of the fuel and the current amount of the fuel injected is greater than or equal to the predetermined value, the amount of the fuel injected may be gradually increased to the required injection amount at varying rates that decrease as the difference widens.

According to the sixth aspect, in accordance with the magnitude of difference between the required injection amount and the current amount of the fuel injected, overspeed may be reduced, and the rotational speed may be promptly recovered to satisfy the driver's demand.

A seventh aspect of the invention is an embodiment of the controller of the fifth or sixth aspect. In the seventh aspect, the amount of the fuel injected is gradually increased to the required injection amount at varying rates that increase as the difference between the second threshold and the current rotational speed of the turbine and compressor widens.

According to the seventh aspect, the rate of increase in the amount of the fuel injected is determined in accordance with the magnitude of difference between the second threshold and the current rotational speed of the turbine and compressor. As a result, overspeed may be reduced, and the rotational speed may be promptly recovered to satisfy the driver's demand.

Advantages of the Invention

According to the present invention, a variable geometry turbocharger may be reliably managed and controlled such that its rotational speed does not exceed its endurance limit.

BRIEF DESCRIPTION OF THE DRAWINGS

FIG. 8 is a graph showing an exemplary method of control performed by a controller for a turbocharged engine according to an embodiment of the present invention.

DESCRIPTION OF EMBODIMENTS

Embodiments of the present invention will now be described with reference to the drawings. Note that the following description of embodiments is merely illustrative in nature, and is not intended to limit the scope, application, or uses of the present invention.

An Embodiment

A controller for a turbocharged engine according to an embodiment of the present invention will be described with reference to FIGS. 1 and 2.

—Schematic Configuration for Engine Controller—

First, schematic configurations for an engine and a controller for the engine will be described.

Figure 1:
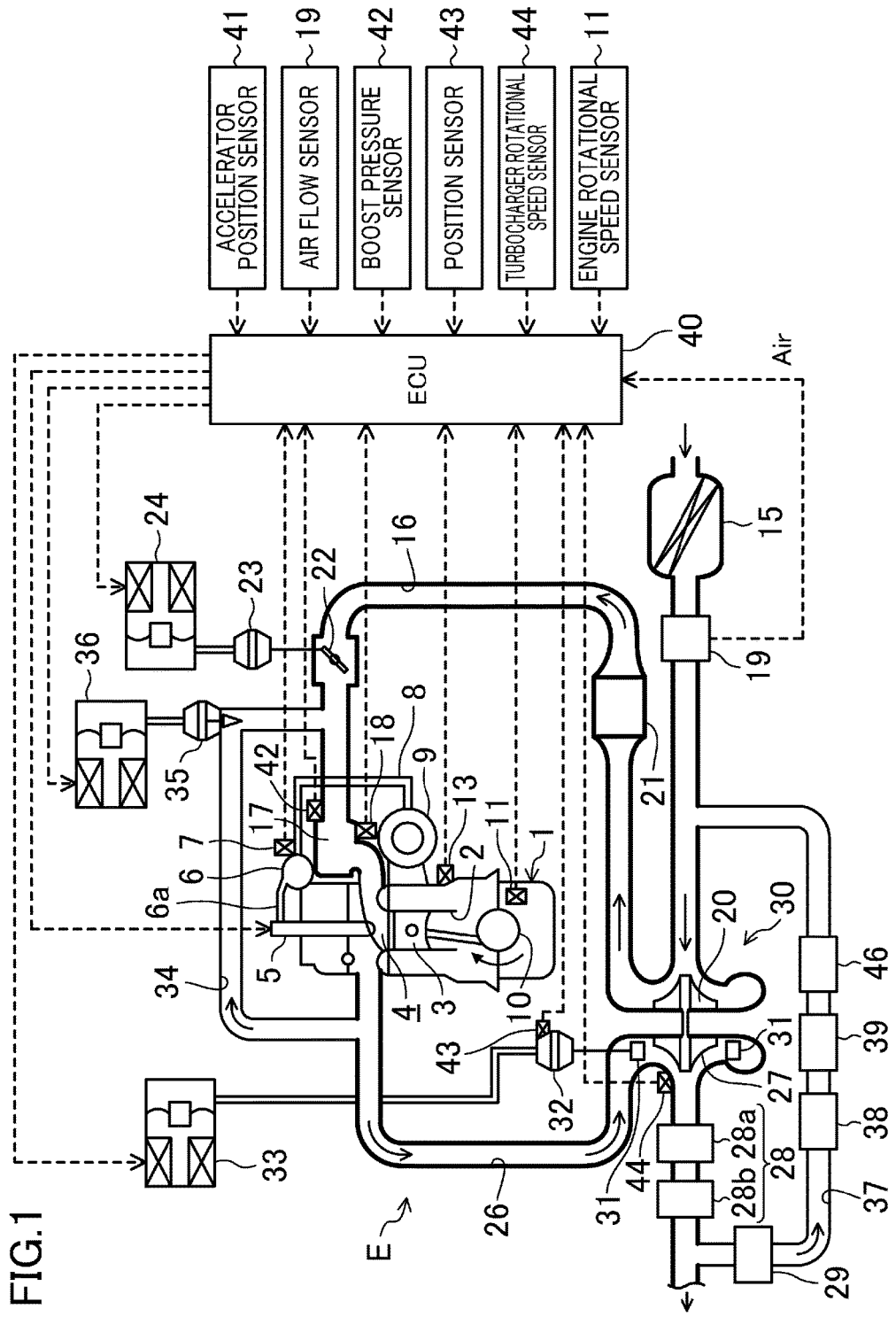
FIG. 1 is a schematic block diagram showing a controller for a turbocharged engine according to an embodiment of the present invention.

FIG. 1 shows general configurations for an engine according to an embodiment of the present invention and a controller for the engine. In this embodiment, the engine E is a direct injection diesel engine, for example. The engine E includes a plurality of cylinders 2, 2, . . . in a body 1. Only one of these cylinders is shown. Pistons 3 are each reciprocatably inserted into, and run through, an associated one of the cylinders 2, and each have a top face defining the floor of an associated one of combustion chambers 4. Meanwhile, the ceiling of the combustion chamber 4 facing the top face of the piston 3 is provided with an injector 5 having a tip end which faces the combustion chamber 4 and through which high-pressure fuel is injected.

The base ends of the injectors 5 are individually connected through manifolds 6a, 6a, . . . to a common rail 6 of the cylinders 2, 2, . . . . Only one of these manifolds 6a, 6a, . . . is shown. A fuel pressure sensor 7 is arranged on the common rail 6, which is connected through a fuel supply pipe 8 to a high-pressure supply pump 9. The amount of fuel supplied from the high-pressure supply pump 9 to the common rail 6 is controlled in accordance with the fuel pressure detected by the fuel pressure sensor 7, thereby maintaining fuel in the common rail 6 under a predetermined high-pressure condition.

A crankshaft 10 is arranged in a crank case of the engine E, and is drivably coupled through a connecting rod to the pistons 3. An electromagnetic pickup engine rotational speed sensor (crank angle sensor) 11 is arranged in the crank case to detect the angle of rotation of a detection target plate that rotates together with the crankshaft 10, that is, the crank angle. An engine water temperature sensor 13 for detecting the coolant temperature in the engine E is arranged to face a water jacket.

An intake passage 16 through which air filtered by an air cleaner 15 is supplied into the combustion chambers 4 of the cylinders 2 is provided on the right side of the engine E shown in FIG. 1. A surge tank 17 is provided at the downstream end of the intake passage 16. Each of passages branching from the surge tank 17 communicates with the combustion chamber 4 of the associated cylinder 2 through an associated one of intake ports. The surge tank 17 is provided with an intake air pressure sensor 18 that detects the pressure of intake air, and a boost pressure sensor 42.

The intake passage 16 is provided with a hot film air flow sensor 19 that detects the flow rate of air (fresh air) sucked from the outside into the engine E, a compressor (rotator) 20 that is driven by a turbine 27 described below to compress intake air, an intercooler 21 that cools the intake air compressed by the compressor 20, and an intake shutter valve 22. The hot film air flow sensor 19, the compressor 20, the intercooler 21, and the intake shutter valve 22 are arranged in this order from an upstream point of the intake passage 16 toward the downstream end thereof. In the example shown in FIG. 1, the position of the intake shutter valve 22 is set somewhere between a fully closed position and a fully open position by having the magnitude of negative pressure acting on a diaphragm 23 regulated through a solenoid valve 24.

An exhaust gas passage 26 through which burned gas is exhausted from the combustion chambers 4 of the respective cylinders 2 is provided on the left side of the engine E shown in FIG. 1. An upstream end portion of the exhaust gas passage 26 is an exhaust manifold that branches into the respective cylinders 2, which each communicate with the combustion chamber 4 through an associated one of exhaust ports. A portion of the exhaust gas passage 26 downstream of the exhaust manifold is provided with the turbine 27 that rotates by receiving an exhaust gas stream, and a catalyst converter 28 that is able to purify the exhaust gas of hazardous components. The turbine 27 and the catalyst converter 28 are arranged in this order from an upstream point in the exhaust gas passage 26 toward the downstream end thereof.

A turbocharger 30 comprised of the turbine 27 and the above-described compressor 20 is a variable geometry turbocharger (VGT) provided with a plurality of movable flaps 31, 31, . . . that are arranged to surround the entire periphery of the turbine 27 and to change the cross-sectional area through which the exhaust gas flows to the turbine 27 (nozzle cross-sectional area). In the example shown in FIG. 1, the flaps 31 are rotated by an actuator while the magnitude of negative pressure acting on the diaphragm 32 is regulated through the solenoid valve 33. A position sensor 43 that detects the degree of opening of the flaps 31 based on the position of the actuator is further provided. The turbocharger 30 is further provided with a turbocharger rotational speed sensor (detector) 44 that detects the rotational speed of the compressor 20.

Figure 2:
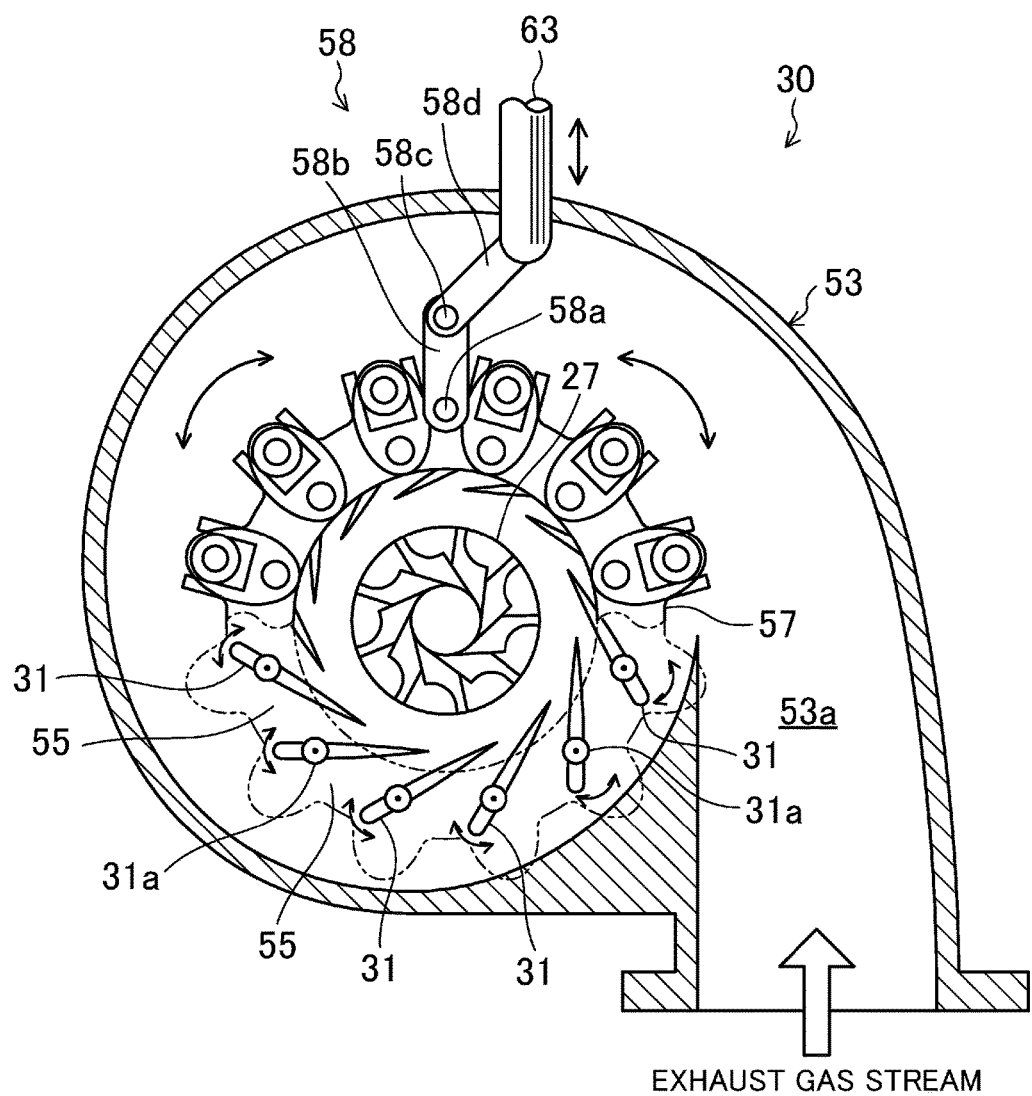
FIG. 2 is an enlarged longitudinal cross-sectional view schematically illustrating a configuration for a turbine chamber of a turbocharger in a controller for a turbocharged engine according to an embodiment of the present invention.

FIG. 2 is an enlarged longitudinal cross-sectional view schematically illustrating a configuration for a turbine chamber of the turbocharger 30. As illustrated in FIG. 2, the movable flaps 31, 31, . . . are arranged in a turbine chamber 53a defined in a turbine casing 53 so as to surround the turbine 27 arranged at a substantially center of the turbine chamber 53a. Each flap 31 is rotatably supported by a spindle 31a passing through one sidewall of the turbine chamber 53a. If each flap 31 rotates around the spindle 31a in a clockwise direction shown in FIG. 2 so as to be inclined toward an adjacent one of the flaps 31, the degree of opening of nozzles 55, 55, . . . formed between adjacent ones of the flaps 31 (nozzle cross-sectional area) is reduced. In this manner, even if the flow rate of the exhaust gas is small, high supercharging efficiency is achievable. On the other hand, if each flap 31 rotates in the opposite direction to the direction described above so as to be inclined away from the adjacent one of the flaps 31, the nozzle cross-sectional area increases. In this manner, even if the flow rate of the exhaust gas is large, the airflow resistance may be reduced, and therefore, the supercharging efficiency may be increased.

A ring member 57 is operatively coupled through a link mechanism 58 to a rod 63 of the actuator. Actuation of the actuator rotates each flap 31 via the ring member 57. Specifically, the link mechanism 58 includes a coupling pin 58a having one end portion rotatably coupled to the ring member 57, a coupling plate member 58b having one end portion rotatably coupled to the other end portion of the coupling pin 58a, a columnar member 58c coupled to the other end portion of the coupling plate member 58b and running through an outer wall of the turbine casing 53, and a coupling plate member 58d having one end portion coupled to a protruding end portion of the columnar member 58c protruding outward of the turbine casing 53, and the other end portion rotatably coupled to the rod 63 of the actuator through a coupling pin (not shown).

As shown in FIG. 1, a portion of the exhaust gas passage 26 upstream of the turbine 27 branches into a high-pressure exhaust gas recirculation passage (hereinafter referred to as an "HP-EGR passage") 34 through which part of the exhaust gas flows back to the intake side, and is connected to the upstream end of the HP-EGR passage. The downstream end of the HP-EGR passage 34 is connected to a portion of the intake passage 16 between the intake shutter valve 22 and the surge tank 17 to allow part of the exhaust gas that has not passed through the turbine 27 yet which is taken from the exhaust gas passage 26 to flow back to the intake passage 16. A recirculating exhaust gas flow rate regulating valve (hereinafter referred to as an "HP-EGR valve") 35 with an adjustable degree of opening is arranged downstream of a middle portion of the HP-EGR passage 34.

In FIG. 1, just like the intake shutter valve 22 and the flaps 31 of the turbocharger 30 which have been described above, the HP-EGR valve 35 operates by having the magnitude of negative pressure acting on the diaphragm regulated through the solenoid valve 36, and continuously changes the cross-sectional area of the HP-EGR passage 34 to regulate the flow rate of the exhaust gas recirculating through the intake passage 16. In other words, the HP-EGR passage 34 and the HP-EGR valve 35 constitute a high-pressure exhaust gas recirculating means that makes part of the exhaust gas of the engine E flow back to an intake system. As shown in FIG. 1, a portion of the exhaust gas passage 26 downstream of a diesel oxidation catalyst (DOC) 28a and a diesel particulate filter (DPF) 28b of the catalyst converter 28 branches into a low-pressure exhaust gas recirculation passage (hereinafter referred to as an "LP-EGR passage") 37 through which part of the exhaust gas flows back to the intake side, and is connected to the upstream end of the LP-EGR passage 37. An exhaust shutter valve 29 is arranged downstream of the branching and connected portion of the LP-EGR passage 37. The downstream end of the LP-EGR passage 37 is connected to the intake passage 16 between the hot film air flow sensor 19 and the compressor 20 to allow part of the exhaust gas that has passed through the turbine 27 which is taken from the exhaust gas passage 26 to flow back to the intake passage 16. A filter 38, an EGR cooler 39, and an LP-EGR valve 46 with an adjustable degree of opening are arranged midway through the LP-EGR passage 37. The flow rate of the exhaust gas flowing back through the LP-EGR passage to the intake passage is regulated with the degrees of opening of the exhaust shutter valve 29 and the LP-EGR valve 46 regulated.

The injector 5, the high-pressure supply pump 9, the intake shutter valve 22, the exhaust shutter valve 29, the turbocharger 30, the HP-EGR valve 35, the LP-EGR valve 46, and other members each operate in response to a control signal supplied from an electronic control unit (hereinafter referred to as an "ECU") 40. Meanwhile, the ECU 40 receives output signals from the fuel pressure sensor 7, the engine rotational speed sensor 11, the engine water temperature sensor 13, the intake air pressure sensor 18, and the air flow sensor 19 described above, and other sensors.

The ECU 40 further receives output signals from an accelerator position sensor 41 that detects the degree to which an accelerator pedal is depressed (accelerator position), a boost pressure sensor 42 that measures the boost pressure, a position sensor 43 that detects the degree of opening of the flaps 31, a turbocharger rotational speed sensor 44 that detects the rotational speed of the compressor 20, an engine rotational speed sensor 11 that detects the rotational speed of the engine E, and other sensors.

—Control Method—

A method of control performed by such a controller for a turbocharged engine according to this embodiment will be described with reference to FIGS. 3-8.

Figure 3:
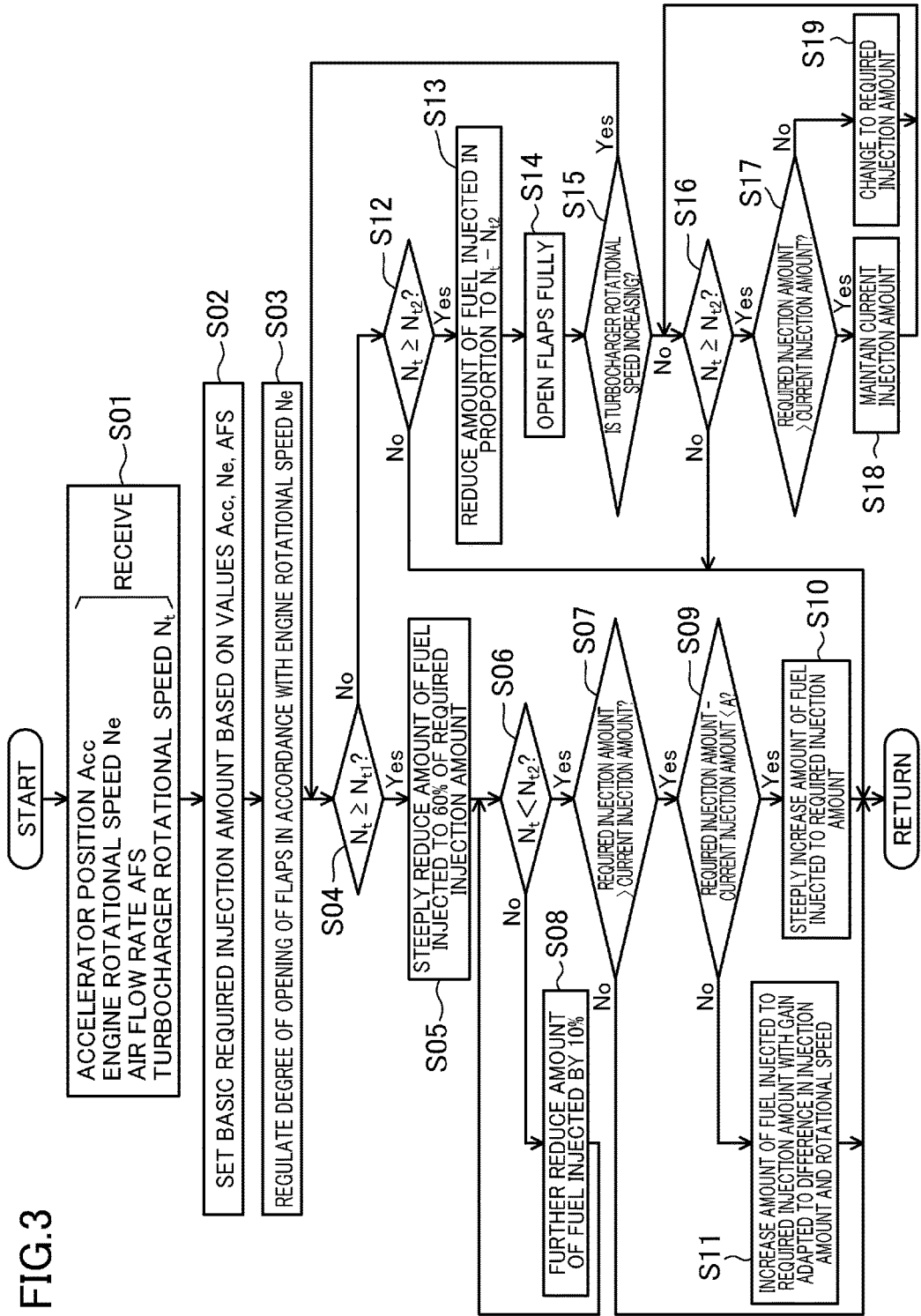
FIG. 3 is a flow chart showing a procedure of control performed by a controller for a turbocharged engine according to an embodiment of the present invention.

FIG. 3 is a flow chart showing a procedure of control for a turbocharged engine. As shown in FIG. 3, in Step S01, the electronic control unit 40 first receives the accelerator position Acc, the engine rotational speed Ne, the air flow rate AFS, and the turbocharger rotational speed Nt from various sensors.

Next, in Step S02, the basic amount of fuel required to be injected (hereinafter simply referred to also as a "required injection amount") is determined based on the accelerator position Acc, engine rotational speed Ne, and air flow rate AFS received.

Next, in Step S03, the degree of opening of the movable flaps 31 provided in the turbine chamber 53a of the turbocharger 30 is regulated in accordance with the engine rotational speed Ne.

Next, in step S04, a determination is made whether or not the turbocharger rotational speed Nt is higher than or equal to a first threshold Nt1. If the turbocharger rotational speed Nt is higher than or equal to the first threshold Nt1, the process proceeds to the next Step S05. If the turbocharger rotational speed Nt is lower than the first threshold Nt1, the process proceeds to Step S12.

Next, in Step S05, the amount of fuel injected is steeply reduced at a predetermined rate with respect to the required injection amount that is a preset value, for example, to 60% of the required injection amount. As used herein, to "steeply reduce" means reducing something at a high negative rate of change.

Next, in Step S06, a determination is made whether or not the turbocharger rotational speed Nt is lower than a second threshold Nt2. If the turbocharger rotational speed Nt is lower than the second threshold Nt2, the process proceeds to the next Step S07. If the turbocharger rotational speed Nt is higher than or equal to the second threshold Nt2, the amount of fuel injected is further reduced by 10% of the required injection amount in Step S08, and then the process goes back to Step S06.

Next, in Step S07, a determination is made whether or not the required injection amount exceeds the current amount of fuel injected. If the required injection amount exceeds the current amount of fuel injected, the process proceeds to the next Step S09. If the required injection amount does not exceed the current amount of fuel injected, the process ends.

Next, in Step S09, a determination is made whether or not the difference between the required injection amount and the current amount of fuel injected is less than a predetermined amount A. If the difference between the required injection amount and the current amount of fuel injected is less than the predetermined amount A, the process proceeds to the next Step S10. If the difference between the required injection amount and the current amount of fuel injected is greater than or equal to the predetermined amount A, the process proceeds to Step S11. The predetermined amount A is varied according to operating conditions, but may be set, depending on the operating condition, to be, for example, about 90% of the required injection amount as a relative value.

In Step S10, since the difference between the required injection amount and the current amount of fuel injected is less than the predetermined amount A, the current amount of fuel injected is steeply increased to the required injection amount, and the process ends. As used herein, to "steeply increase the current amount of fuel injected to the required injection amount" means, as in Step S10 in FIG. 4, increasing the current amount steeply at an infinite rate of change.

Figure 4:
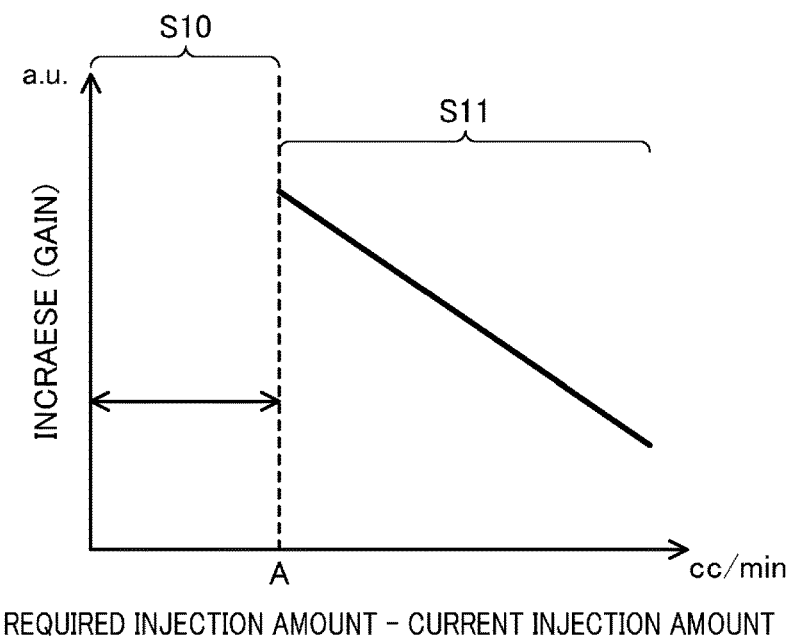
FIG. 4 is a graph showing an exemplary method of control performed by a controller for a turbocharged engine according to an embodiment of the present invention.
Figure 5:
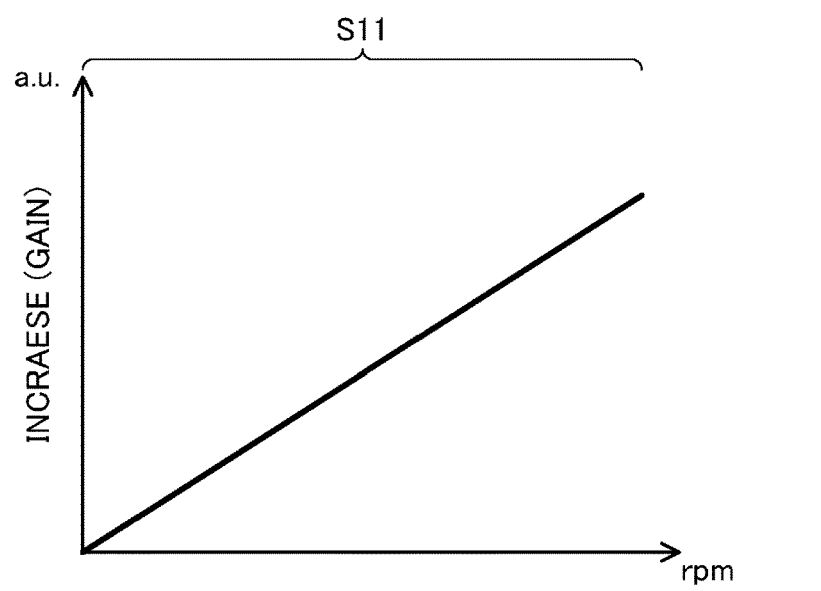
FIG. 5 is a graph showing another exemplary method of control performed by a controller for a turbocharged engine according to an embodiment of the present invention.

In Step S11, the current amount of fuel injected is increased to the required injection amount at a rate of change associated with the difference between the required injection amount and the current amount of fuel injected, as in Step S11 in shown FIG. 4. Simultaneously, as in Step S11 shown in FIG. 5, the current amount of fuel injected is increased to the required injection amount in proportion to the difference between the turbocharger rotational speed and the second threshold Nt2, and the process ends. This allows the amount of fuel injected to recover the required injection amount without causing a driver to feel something different.

On the other hand, if, in Step S04, the turbocharger rotational speed Nt is less than the first threshold Nt1, a determination is made, in Step S12, whether or not the turbocharger rotational speed Nt is higher than or equal to the second threshold Nt2. If the turbocharger rotational speed Nt is higher than or equal to the second threshold Nt2, the process proceeds to the next Step S13. If the turbocharger rotational speed Nt is less than the second threshold Nt2, the process ends.

Figure 6:
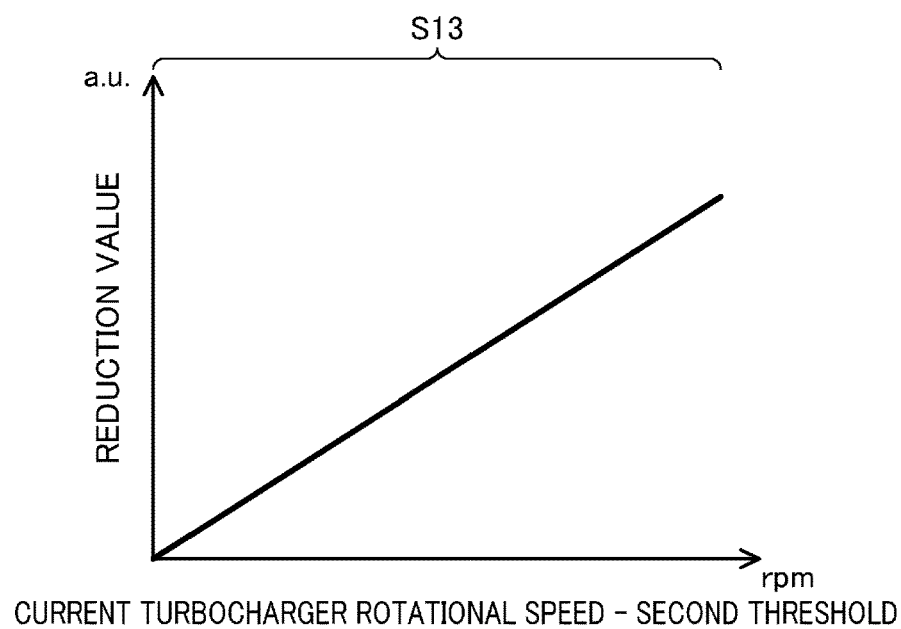
FIG. 6 is a graph showing still another exemplary method of control performed by a controller for a turbocharged engine according to an embodiment of the present invention.

Next, in Step S13, the amount of fuel injected is reduced in proportion to the difference between the turbocharger rotational speed Nt and the second threshold Nt2 as in Step S13 shown in FIG. 6.

Next, in Step S14, the flaps 31 of the turbocharger 30 are fully opened, thereby reducing the exhaust energy received by the turbocharger 30.

Next, in Step S15, a determination is made whether or not the turbocharger rotational speed Nt is increasing. If the turbocharger rotational speed Nt is increasing, the process goes back to Step S04. If the turbocharger rotational speed Nt is not increasing, the process proceeds to the next Step S16.

Next, in Step S16, a determination is made whether or not the turbocharger rotational speed Nt is higher than or equal to the second threshold Nt2. If the turbocharger rotational speed Nt is higher than or equal to the second threshold Nt2, the process proceeds to the next Step S17. If the turbocharger rotational speed Nt is less than the second threshold Nt2, the process ends.

Next, in Step S17, a determination is made whether or not the required injection amount exceeds the current amount of fuel injected. If the required injection amount exceeds the current amount of fuel injected, the process proceeds to the next Step S18. If the required injection amount does not exceed the current amount of fuel injected, the process proceeds to Step S19.

Next, in Step S18, since the required injection amount exceeds the current amount of fuel injected, i.e., since the current amount of fuel injected is short of the required injection amount, the current amount of fuel injected is maintained as it is.

In Step S19, since the required injection amount does not exceed the current amount of fuel injected, i.e., since the current amount of fuel injected is larger than or equal to the required injection amount, the current amount of fuel injected is changed to the required injection amount, and the process goes back to Step S16.

This is an exemplary procedure of control to be performed by a controller for a turbocharged engine according to this embodiment.

Figure 7:
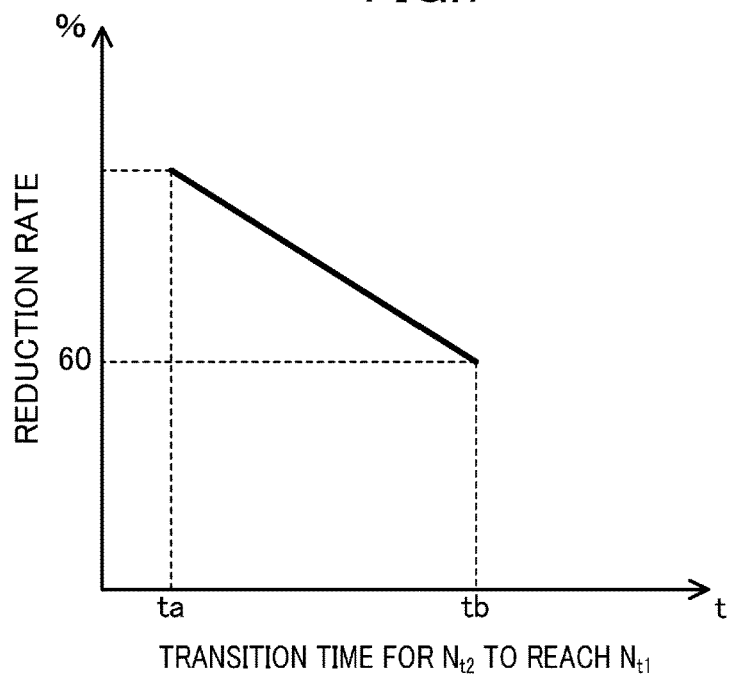
FIG. 7 is a graph showing a modified method of control performed by a controller for a turbocharged engine according to an embodiment of the present invention.

In Step S05, the amount of fuel injected is uniformly reduced to 60% of the required injection amount. In a variation of this step, the fuel reduction rate may be varied according to the amount of time it takes for the turbocharger rotational speed to reach its first threshold Nt1 from its second threshold Nt2, as shown in FIG. 7. For example, in FIG. 7, the amount of fuel injected may be reduced to 60% of the required injection amount in a second amount of time tb longer than a first amount of time ta within the period of time during which the turbocharger rotational speed changes from its second threshold Nt2 to its first threshold Nt1. Although not shown, the amount of fuel injected may be reduced to 60% of the required injection amount in some other amount of time between the first amount of time ta (inclusive) and the second amount of time tb (exclusive).

EXAMPLE

Next, it will be described, as an example of the embodiment described above, with reference to the timing chart shown in FIG. 8 how the turbocharger rotational speed, the fuel reduction rate, and the required injection amount change.

As shown in FIG. 8, in this example, the endurance limit of the turbocharger 30 is 260,000 revolutions per minute, the first threshold Nt1 is 250,000 revolutions per minute, and the second threshold Nt2 is 240,000 revolutions per minute.

First, at Time t1 shown in FIG. 8, it has been determined in Step S12 shown in FIG. 3 that the turbine rotational speed Nt has reached the second threshold Nt2. Furthermore, in the next Step S13, the amount of fuel injected is reduced in accordance with the difference between the turbocharger rotational speed Nt and the second threshold Nt2.

During the interval from Time t1 to the next Time t2, it is determined in Step S15 that the turbocharger rotational speed Nt is now increasing.

At the next Time t2, it is determined in Step S04 that the turbocharger rotational speed Nt has reached the first threshold Nt1. Thus, in the next Step S05, the amount of fuel injected is steeply reduced to 60% of the required injection amount.

If, at the next Time t3, the difference between the current amount a0 of fuel injected and the required injection amount a1 turns out to be less than the predetermined amount A, the current amount of fuel injected is steeply increased to the required injection amount in Step S10. If the difference between the current amount a0 of fuel injected and the required injection amount a2 turns out to be greater than or equal to the predetermined amount A, the current amount a0 of fuel injected is gradually increased in Step S11 to the required injection amount a2 with a gain adapted to the difference in the amount of fuel injected and the difference between the turbocharger rotational speed and the second threshold Nt2.

On the other hand, if, during the interval between Times t2 and t3, the turbocharger rotational speed does not increase to the first threshold Nt1 like the turbocharger rotational speed N∝t shown in FIG. 8, it is determined in Step S15 that the turbocharger rotational speed Nt is not increasing. In this case, if the current amount of fuel injected is less than the required injection amount, the current amount a0 of fuel injected is maintained in Step S18. If the current amount of fuel injected is larger than or equal to the required injection amount, the current amount of fuel injected is changed to the required injection amount in Step S19.

Note that the foregoing example is only an exemplary one.

In the embodiment described above, a diesel engine is used as an exemplary engine E. However, the present invention is not limited to diesel engines, but is applicable also to gasoline engines.

—Advantages—

As can be seen from the foregoing description, according to various embodiments and examples described above, a turbocharger may be controlled so as to prioritize prevention of its overspeed at a point in time when the turbocharger rotational speed reaches the first threshold Nt1. If the turbocharger rotational speed is between the first and second thresholds Nt1 and Nt2, the turbocharger may be controlled so as to prioritize supercharging performance with the increase in rotational speed reduced. Besides, this fuel control may prevent a driver from feeling something strange about the behavior of the vehicle. In addition, the overspeed may be reduced, and the intended rotational speed may be promptly recovered to satisfy the driver's demand.

INDUSTRIAL APPLICABILITY

As can be seen from the foregoing description, a controller for a turbocharged engine according to the present invention may be used, for example, in applications in which a variable geometry turbocharger needs to be reliably managed and controlled to prevent the rotational speed of the variable geometry turbocharger from exceeding its endurance limit.

DESCRIPTION OF REFERENCE CHARACTERS

E Engine
1 Body
2 Cylinder
3 Piston
4 Combustion Chamber
5 Injector
6 Common Rail
6a Manifold
7 Fuel Pressure Sensor
8 Fuel Supply Pipe
9 High-Pressure Supply Pump
10 Crankshaft
11 Engine Rotational Speed Sensor (Crank Angle Sensor)
13 Engine Water Temperature Sensor
15 Air Cleaner
16 Intake Passage
17 Surge Tank
18 Intake Air Pressure Sensor
19 Air Flow Sensor
20 Compressor (Rotator)
21 Intercooler
22 Intake Shutter Valve
23, 32 Diaphragm
24, 33, 36 Solenoid Valve
26 Exhaust Gas Passage
27 Turbine (Rotator)
28a Diesel Oxidation Catalyst (DOC)

28b Diesel Particulate Filter (DPF)
29 Exhaust Shutter Valve
30 Turbocharger
31 Flap
31a Spindle
34 High-Pressure Exhaust Gas Recirculation Passage
35 Recirculating Exhaust Gas Flow Rate Regulating Valve
37 Low-Pressure Exhaust Gas Recirculation Passage
38 Filter
39 EGR Cooler
40 Electronic Control Unit
41 Accelerator Position Sensor
42 Boost Pressure Sensor
43 Position Sensor
44 Turbocharger Rotational Speed Sensor (Detector)
46 LP-EGR Valve

The invention claimed is:

1. A controller for a turbocharged engine that has a turbocharger including movable flaps arranged so that a boost pressure generated in an intake passage is adjustable, the controller being configured to:
receive a rotational speed of the turbocharger from a turbocharger rotational speed detector;
determine an amount of fuel injected to the engine by a fuel injector of the engine, wherein the controller has a predefined rotational speed endurance limit, a first threshold of the rotational speed lower than the endurance limit, and a second threshold of the rotational speed lower than the first threshold;
reduce the amount of fuel injected at a first reduction rate to a predetermined amount when the rotational speed exceeds the first threshold, the first reduction rate being inversely related to an amount of time required for the rotational speed to reach the first threshold from the second threshold; and
reduce the amount of fuel injected at a second reduction rate when the rotational speed has not yet exceeded the first threshold but exceeds the second threshold, the second reduction rate being lower than the first reduction rate and set in proportion to a difference between the rotational speed and the second threshold.

2. A controller for a turbocharged engine that has a turbocharger including movable flaps arranged so that a boost pressure generated in an intake passage is adjustable, the controller being configured to:
receive a rotational speed of the turbocharger from a turbocharger rotational speed detector;
determine an amount of fuel injected to the engine by a fuel injector of the engine, wherein the controller has a predefined rotational speed endurance limit, a first threshold of the rotational speed lower than the endurance limit, and a second threshold of the rotational speed lower than the first threshold;
reduce the amount of fuel injected at a first reduction rate to a predetermined amount when the rotational speed exceeds the first threshold;
reduce the amount of fuel injected at a second reduction rate when the rotational speed has not yet exceeded the first threshold but exceeds the second threshold, the second reduction rate being lower than the first reduction rate and set in proportion to a difference between the rotational speed and the second threshold; and
in a situation where the rotational speed is in a range of rotational speeds lower than or equal to the second threshold after the amount of fuel injected has been reduced,
steeply increase the amount of fuel injected to the required injection amount when a difference between the required injection amount of the fuel and a current amount of fuel injected is less than a predetermined value, and
gradually increase the amount of fuel injected to the required injection amount when the difference is greater than the predetermined value.

3. The controller of claim 2, wherein the controller is further configured to:
gradually increase the amount of the fuel injected to the required injection amount at varying rates that decrease as the difference widens when the difference between the required injection amount of the fuel and the current amount of the fuel injected is greater than or equal to the predetermined value.

4. The controller of claim 2, wherein the controller is further configured to:
gradually increase the amount of the fuel injected to the required injection amount at varying rates that increase as the difference between the second threshold and the current rotational speed of the turbine and compressor widens.

5. The controller of claim 2, wherein the controller is further configured to:
maintain the amount of fuel injected when the rotational speed stops increasing at a point in time before reaching the first threshold.

6. The controller of claim 3, wherein the controller is further configured to:
gradually increase the amount of the fuel injected to the required injection amount at varying rates that increase as the difference between the second threshold and the current rotational speed of the turbine and compressor widens.

7. The controller of claim 1, wherein the controller is further configured to:
maintain the amount of fuel injected when the rotational speed stops increasing at a point in time before reaching the first threshold.

8. The controller of claim 1, wherein the controller is further configured to:
fully open the movable flaps when the rotational speed has not yet exceeded the first threshold but exceeds the second threshold.

* * * * *